(12) United States Patent
Han

(10) Patent No.: US 10,466,737 B2
(45) Date of Patent: Nov. 5, 2019

(54) CONTROL SYSTEM FOR OVERCLOCKING COMPUTER

(71) Applicant: EVGA CORPORATION, New Taipei (TW)

(72) Inventor: Yu-Sheng Han, New Taipei (TW)

(73) Assignee: EVGA CORPORATION, New Taipei (TW)

( * ) Notice: Subject to any disclaimer, the term of this patent is extended or adjusted under 35 U.S.C. 154(b) by 0 days.

(21) Appl. No.: 15/669,955

(22) Filed: Aug. 6, 2017

(65) Prior Publication Data
US 2018/0059711 A1    Mar. 1, 2018

(30) Foreign Application Priority Data
Aug. 26, 2016    (TW) .............................. 105213043 U

(51) Int. Cl.
| | |
|---|---|
| *G06F 1/08* | (2006.01) |
| *G06F 1/18* | (2006.01) |
| *G06F 1/20* | (2006.01) |
| *G06F 1/26* | (2006.01) |
| *G06F 13/40* | (2006.01) |

(52) U.S. Cl.
CPC .............. *G06F 1/08* (2013.01); *G06F 1/181* (2013.01); *G06F 1/182* (2013.01); *G06F 1/20* (2013.01); *G06F 1/266* (2013.01); *G06F 13/4068* (2013.01)

(58) Field of Classification Search
CPC ........ G06F 13/4068; G06F 1/08; G06F 1/181; G06F 1/182; G06F 1/20; G06F 1/266
See application file for complete search history.

(56) References Cited

U.S. PATENT DOCUMENTS

| | | | |
|---|---|---|---|
| 7,382,366 B1* | 6/2008 | Klock ..................... | G06F 1/206 345/213 |
| 8,006,105 B1* | 8/2011 | Sivertsen ................. | G06F 1/16 174/520 |
| 2005/0060122 A1* | 3/2005 | Lin ..................... | G06F 11/0745 702/183 |
| 2009/0116191 A1* | 5/2009 | Liou ........................ | G06F 1/20 361/695 |
| 2016/0033974 A1* | 2/2016 | North ....................... | G06F 1/20 700/300 |
| 2017/0102749 A1* | 4/2017 | Han ........................ | G06F 1/206 |

* cited by examiner

Primary Examiner — Terrell S Johnson
(74) Attorney, Agent, or Firm — Leong C. Lei

(57) ABSTRACT

A control system for overclocking a computer is disclosed. The control system includes a casing for housing a computer assembly and, on the casing, a control device electrically connected to the computer assembly, a display device electrically connected to the control device, an operation device data-linked to the control device, and a fan device electrically connected to the control device so as to be controlled by the operation device.

10 Claims, 6 Drawing Sheets

CONTROL SYSTEM FOR OVERCLOCKING COMPUTER

BACKGROUND OF THE INVENTION

(a) Technical Field of the Invention

The present invention generally relates to computer overclocking and, more particularly, to a control system for overclocking a computer.

(b) Description of the Prior Art

For a computer to operate in a reliable manner, the operation parameters of the components of the computer in the Basic Input/Output System (BIOS) are set under their safety values. As long as the components are operated within these safety values, the components are not overloaded and theoretically may achieve higher performance by adjusting these parameters.

Among these parameters, the working frequency and working voltage are most related to the performance. Therefore, to achieve better performance, the working frequency and voltage parameters of BIOS are increased. This operation is usually referred to as "overclocking." Overclocking may cause damages to the components and therefore is conducted only when there is some special requirement.

To adjust working frequency or voltage, the computer has to be restarted so that the computer may enter the configuration mode of the BIOS, which is rather inconvenient.

SUMMARY OF THE INVENTION

A major objective of the present invention to control overclocking directly from the casing of a computer without restarting the computer.

To achieve the objective, a control system for overclocking a computer includes a casing for housing a computer assembly and a control device on the casing electrically connected to the computer assembly. There is a temperature sensing device inside the casing electrically connected to the control device.

Also on the casing, there is a display device electrically connected to the control device, an operation device data-linked to the control device, and a fan device electrically connected to the control device. The control device activates the fan device so as to adjust the temperature inside the casing. The temperature sensing device detects temperature inside the casing. The display device shows the status of the fan device or the temperature inside the casing. Without restarting the computer, the operation device adjusts the operation of the fan device through the control device. To overclocking the computer, the operation device adjusts the operation of the fan device and the computer assembly through the control device without restarting the compute. To turn off overclocking, the operation device also directly restores the normal operation of the fan device and the computer assembly. Through the control system, the inconvenience of prior overclock mechanism is resolved with enhanced simplicity and speed.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
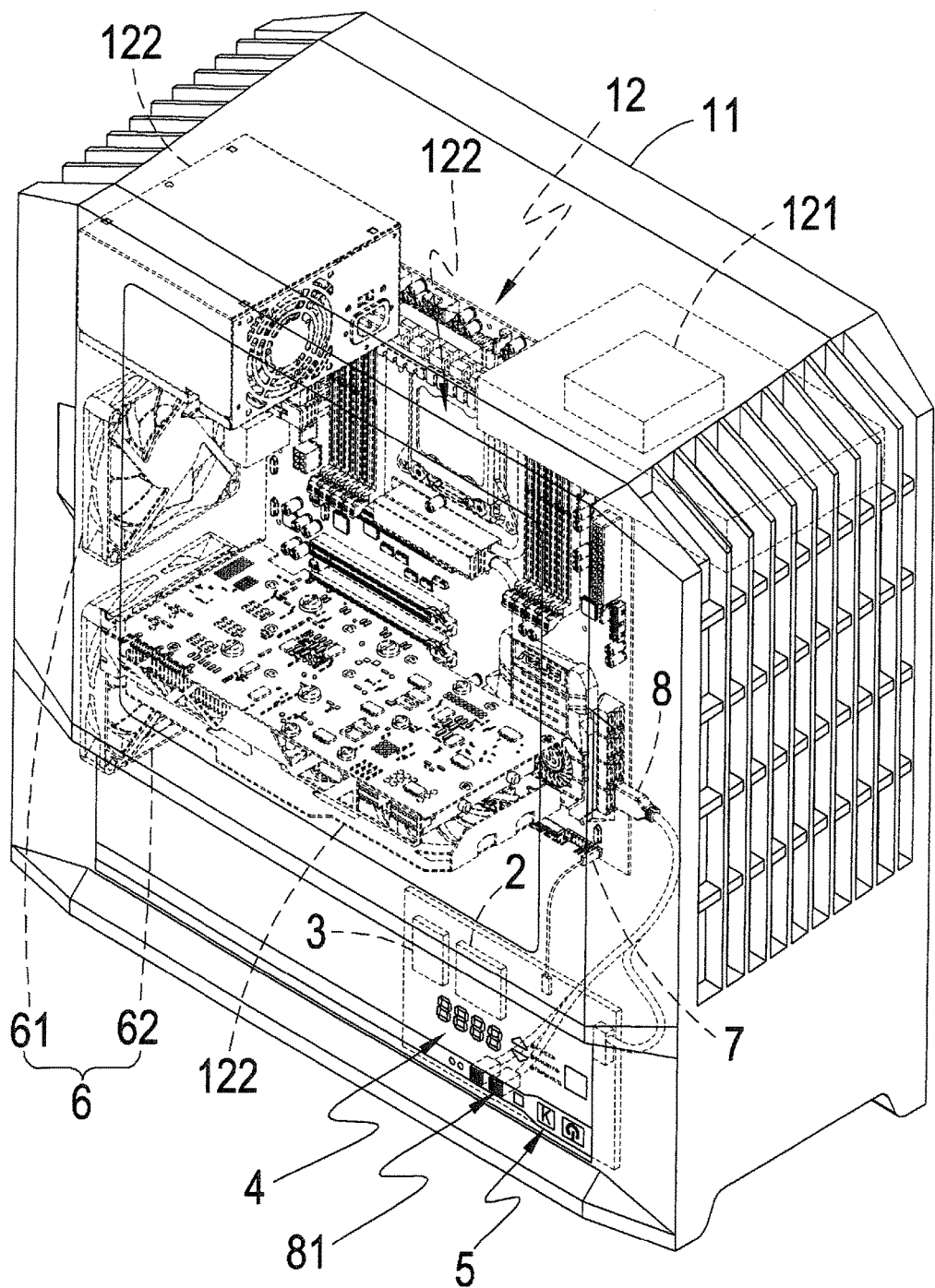
FIG. 1 is a perspective diagram showing a control system for overclocking a computer according to an embodiment of the present invention.
Figure 1A:
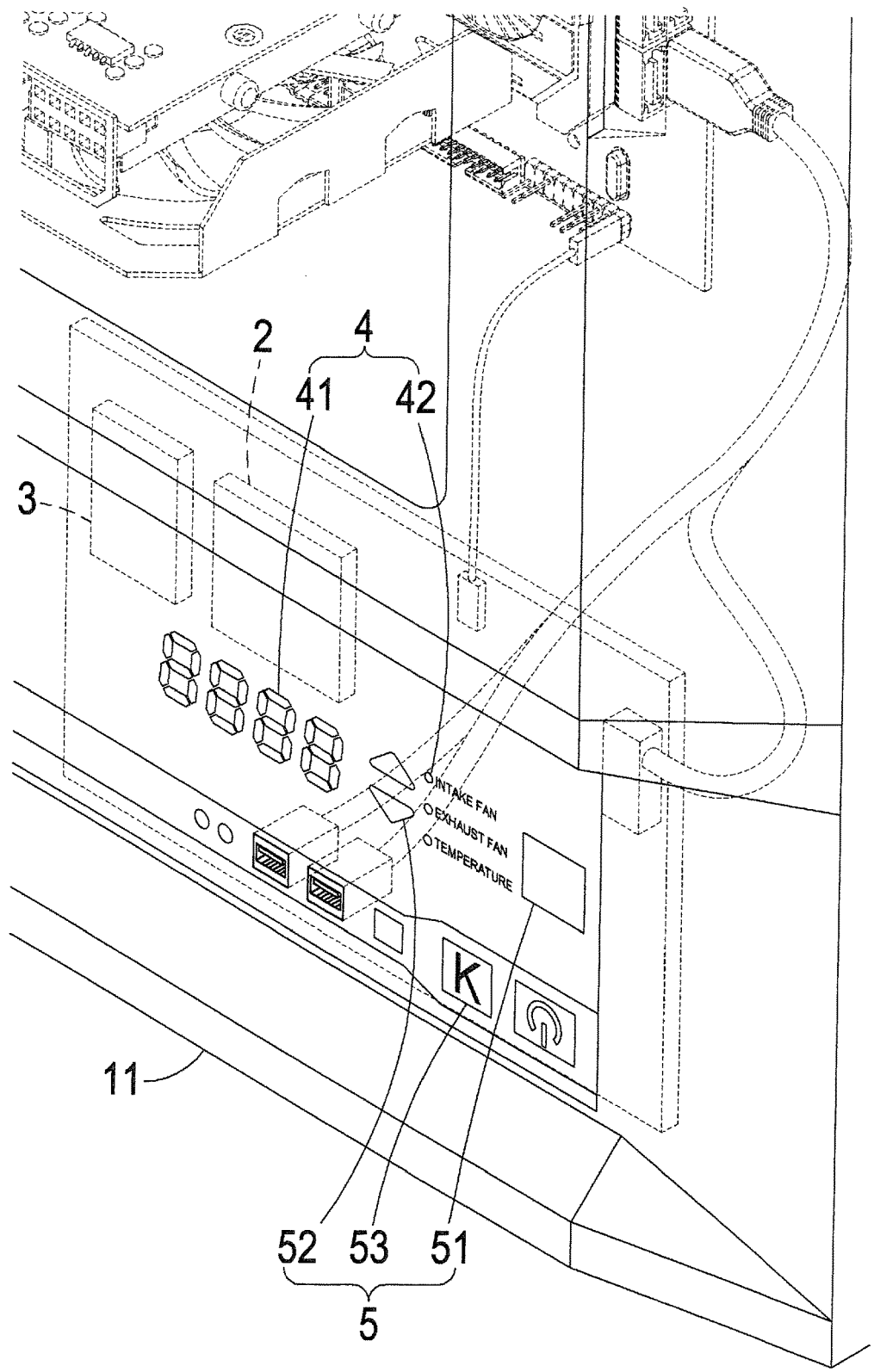
FIG. 1A is a perspective diagram showing a partial detailed view the control system of FIG. 1.

As shown in FIGS. 1 and 1A, a control system for overclocking a computer according to an embodiment of the present invention includes a casing 11, a control device 2, a temperature sensing device 3, at least a display device 4, at least an operation device 5, and at least a fan device 6. The casing houses a computer assembly 12 which includes at least a driving device 121 data-linked with the control device 2, and at least a processing device 122 data-linked with the driving device 121. In the present embodiment, the driving device 121 includes a driver program, and the processing device 122 may be one of a main board, a Central Processing Unit (PU), a display card, and a power supply.

The control device 2 is configured on the casing 11 and is electrically connected to the computer assembly 12 through at least a connection port 8. The connection port 8 is electrically connected to an extension port 81 configured on the casing 11. In the present embodiment, both the connection port and the extension port 81 conform to Universal Serial Bus (USB) specification. The control device 2 is electrically connected to at least a power device 7, which is electrically connected to the computer assembly 12. The power device 7 provides one of a DC 12V or a DC 5V connector. In the present embodiment, the power device 7 provides a 12V connector.

The temperature sensing device 3 is configured inside the casing 11 and is electrically connected to the control device 2. In the present embodiment, the temperature sensing device 3 is adjacent to the control device 2 but is not limited as such. The temperature sensing device 3 could be any-where inside the casing 11. The display device 4 is configured on the casing 11 and is adjacent and electrically connected to the control device 2. In the present embodiment, the display device 4 includes at least a seven-segment display 41, and at least a lighting element 42 adjacent to the seven-segment display 41.

The operation device 5 is configured on the casing 11 and is adjacent to the display device 4 and data-linked to the control device 2 to control the computer assembly 12. In the present embodiment, the operation device 5 includes multiple keys and at least a display switch element 51, at least an adjustment element 52 adjacent to the display switch element 51, and at least a mode switch element 53 adjacent to the adjustment element 52.

The fan device 6 is configured on the casing 11, and is electrically connected to the control device 2 so as to be controlled by the operation device 5. In the present embodiment, the fan device 6 includes at least an inflow element 61 and at least an outflow element 62 configured oppositely to the inflow element 61. However, this arrangement is only exemplary and the present invention is not limited as such.

Figure 2:
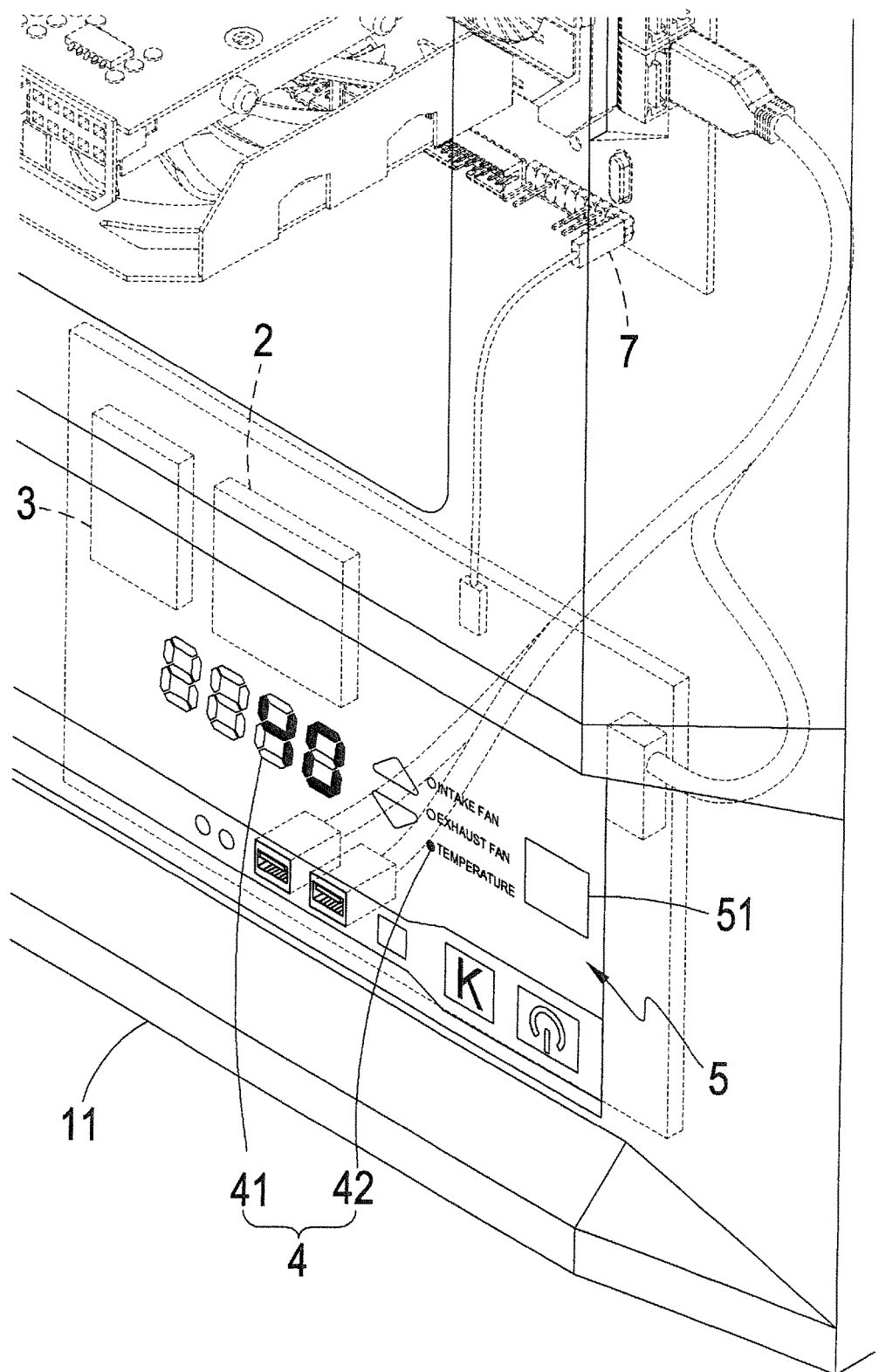
FIG. 2 is a perspective diagram showing a scenario of the control system of FIG. 1.
Figure 3:
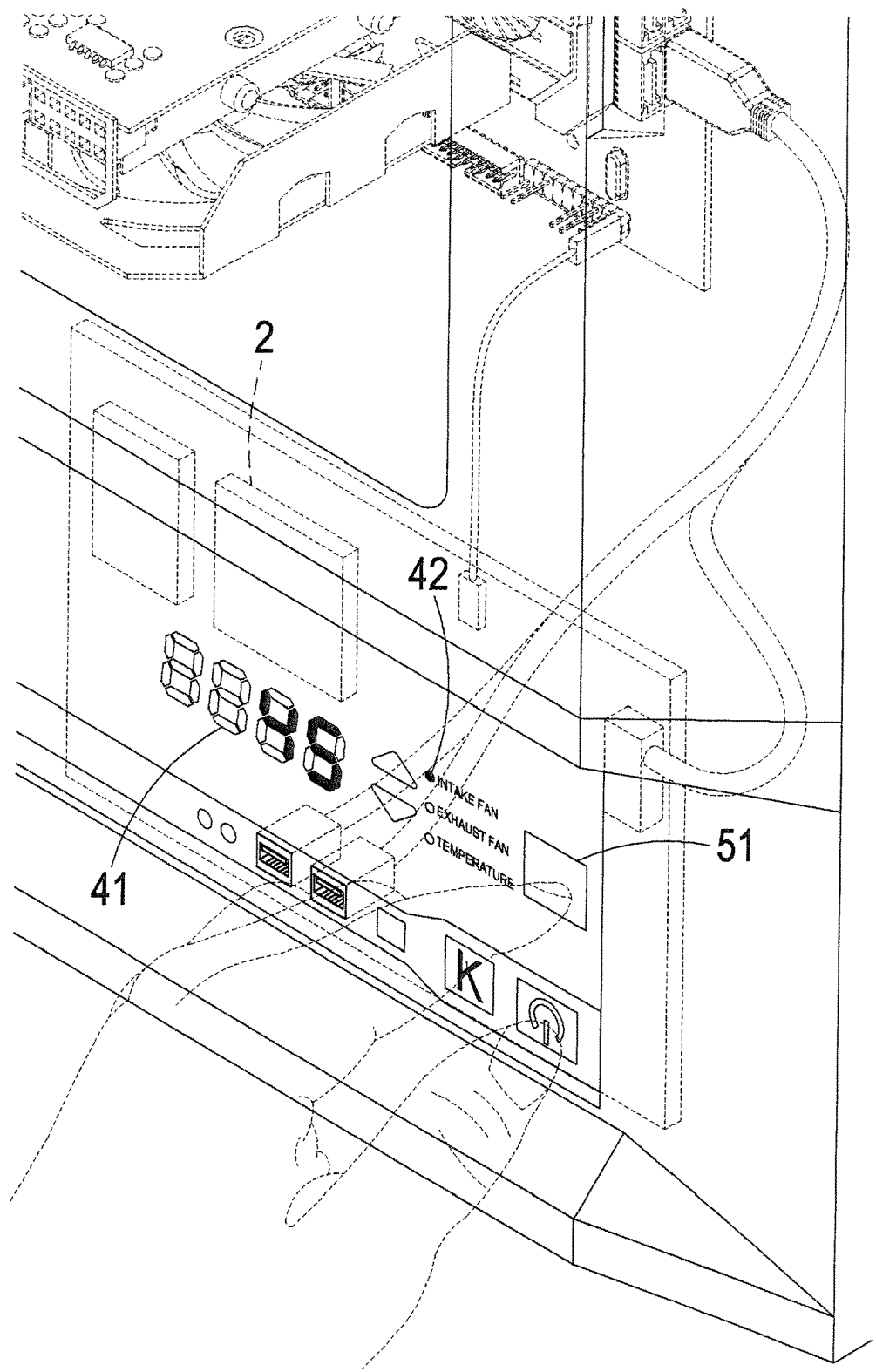
FIG. 3 is a perspective diagram showing another scenario of the control system of FIG. 1.

As shown in FIGS. 1 to 5, the operation of the control system is as follows. The control device 2 is powered by the power device 7, and control the fan speeds of the inflow and outflow elements 61 and 62 of the fan device 6 in terms of either a ratio to the maximum fan speed or a specific revolution per minute (RPM) value. The actual fan speed information is fed to and shown on the display device 4's seven-segment display 41. In the meantime, the temperature sensing device 3 detects the temperature inside the casing 11, and the temperature information is delivered to the control device 2 and the control device 2 sends the temperature information to the seven-segment display 41. In addition, the control device 2 may also turn on the lighting element 42. The display switch element 51 of the operation device 5 may be used to let the display device 4 to present different information. For example, a user may select to show the ratio to the maximum fan speed or the RPM value of the inflow element 61, the ratio to the maximum fan speed or the RPM value of the outflow element 62, or the temperature sensed by the temperature sensing device 3. In FIG. 2, a sensed temperature (40 degrees) is used as an example.

Figure 4:
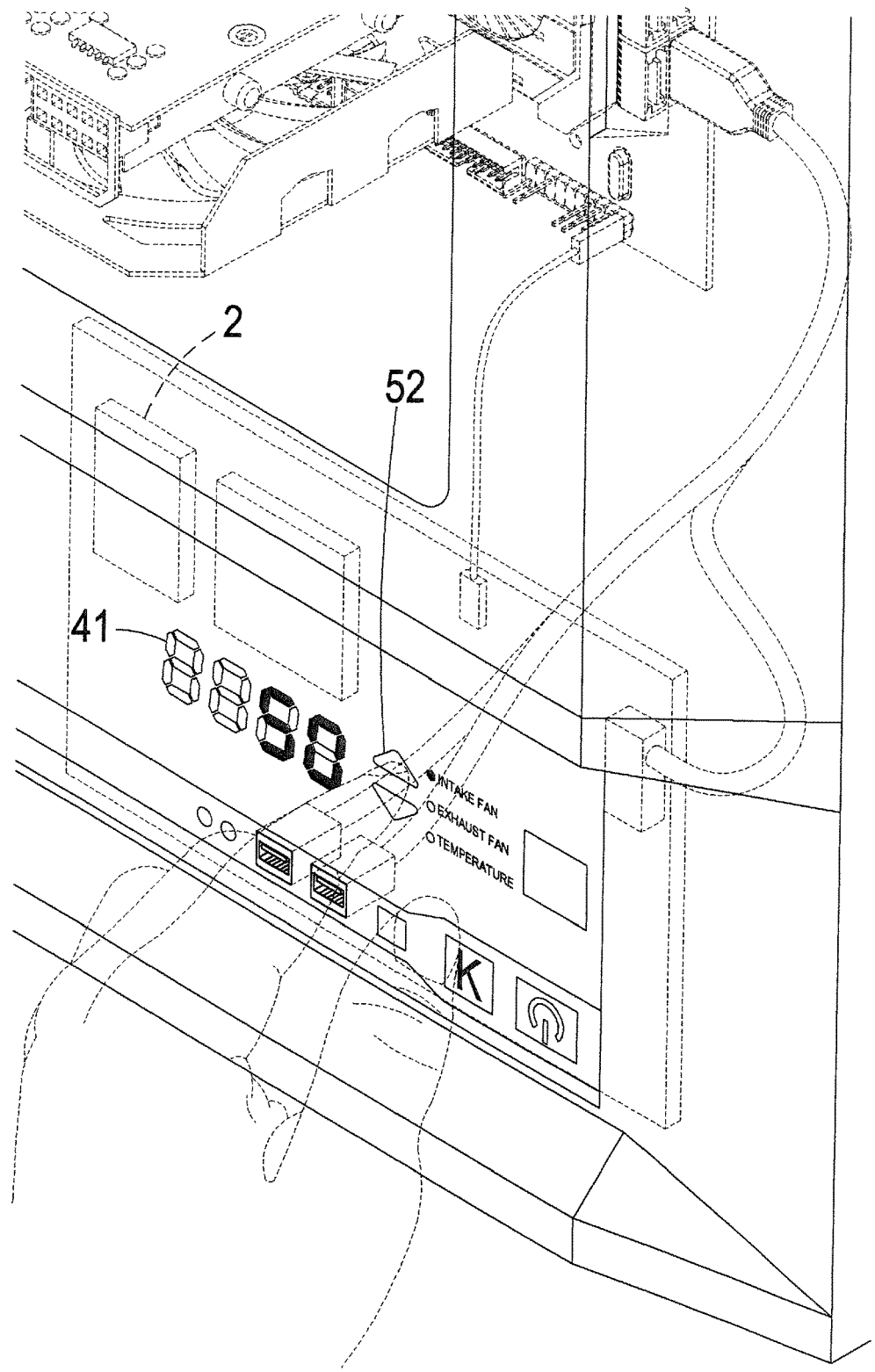
FIG. 4 is a perspective diagram showing another scenario of the control system of FIG. 1.

To change the fan speed of the inflow or outflow element 61 or 62, the mode switch element 51 is engaged which triggers the control device 2 to turn on the lighting element 42 and the seven-segment display 41 to show the current mode and fan speed. For example, in FIG. 3, the mode is switched to an inflow mode and the inflow element 61 is shown to operate at 45% of the maximum fan speed. Then, by operating the adjustment element 52 and through the control device 2, the fan speed of the inflow element 61 or the outflow element 62 may be adjusted and the seven-segment display 41 may present the resulted change synchronously, which is rather convenient. For example, as shown in FIG. 4, through the adjustment element 52, the fan speed of the inflow element 61 is increased to 50% of the maximum fan speed.

Figure 5:
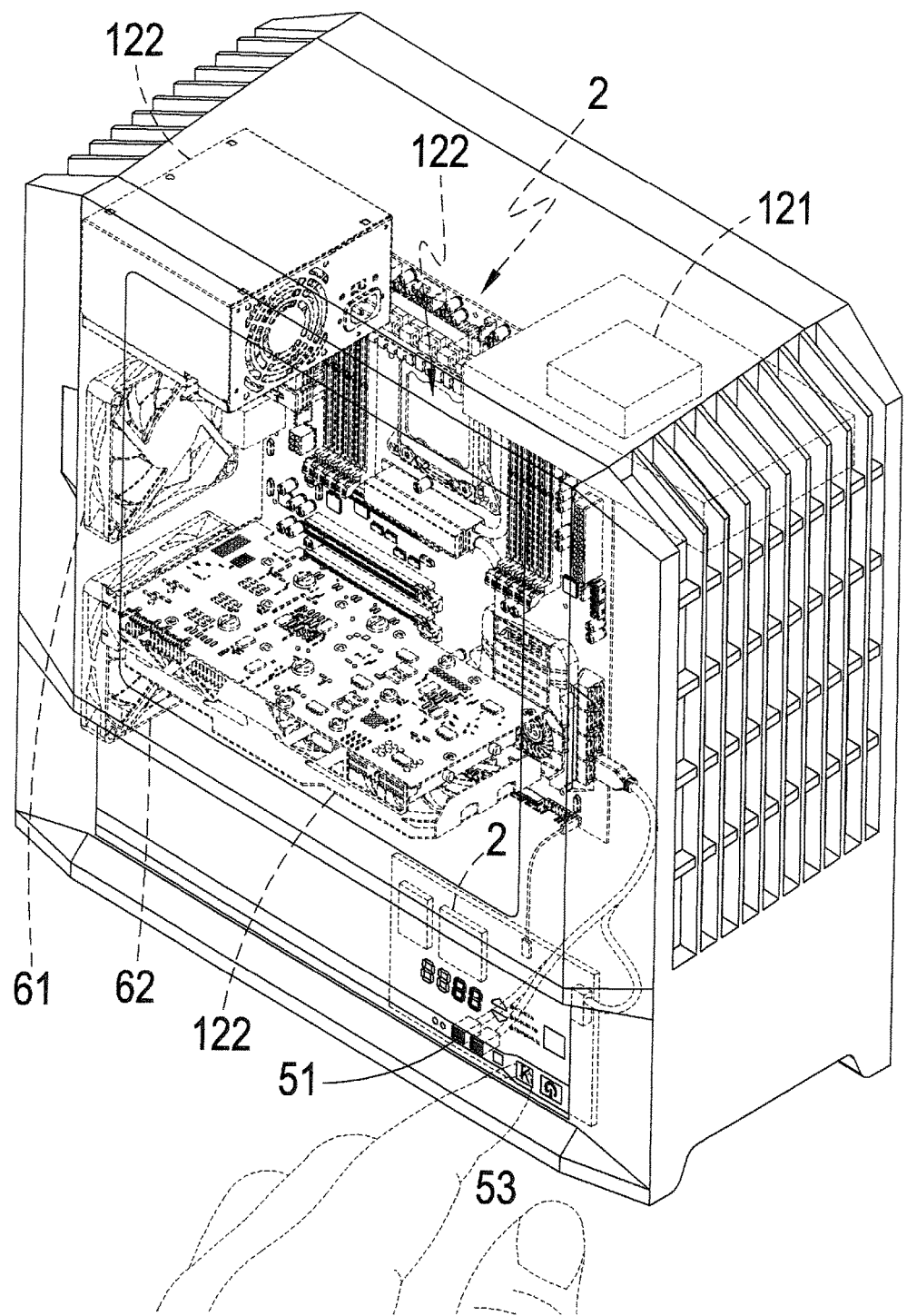
FIG. 5 is a perspective diagram showing another scenario of the control system of FIG. 1.

To conduct overclocking, the mode switch element 53 is operated to directly turn on the overclocking mode without restarting the computer. The control device 2 would, according to the overclocking settings, synchronously change the fan speed of the inflow element 61 or the outflow element 62, and instruct the driving device 121 to overclock the processing device 122. For example, as shown in FIG. 5, the overclocking mode is engaged through the mode switch element 53, causing the fan speed of the inflow element 61 to be increased to 80% of the maximum fan speed. To terminate overclocking, the mode switch element 53 is operated to shut down the overclocking mode. Again, the operation is convenient and quick. The various settings under the overclocking mode such as the fan speeds of the inflow and outflow elements 61 and 62, and the working frequencies and voltages of the various processing devices 122 may be set through the driving device 121 to fit specific requirements.

When the control system of the present invention is turned on, the mode switch element 53 will be automatically activated and the control device 2 passes the previous operation parameters to the inflow element 61, the outflow element 62, and the driving device 121 so that the overclocking mode may be directly applied.

The update to the program of the control device 2 may be carried out through connecting a USB device storing the new program to the extension port 81.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A control system for overclocking a computer, comprising
    a casing for housing a computer assembly;
    a control device on the casing electrically connected to the computer assembly;
    at least a temperature sensing device inside the casing electrically connected to the control device, where the at least a temperature sensing device detects a temperature inside the casing;
    at least a fan device on the casing electrically connected to the control device, where the at least a fan device's speed is controlled by the operation device;
    at least a display device on the casing adjacent and electrically connected to the control device, where the display device receives a speed information of the at least a fan device, and a temperature information from the at least a temperature sensing device, both from the control device; and
    at least an operation device on the casing adjacent to the display device and data-linked to the control device to control the computer assembly, where the operation device comprises at least a display switch element and at least a mode switch element, the display switch element controls the display device to show either the speed information or the temperature information, and the mode switch element turns on or off an overclocking mode of the computer assembly without restarting the computer assembly.

2. The control system according to claim 1, further comprising at least a power device electrically connected to the control device and the computer assembly.

3. The control system according to claim 2, wherein the power device provides one of a DC 12V and or a DC 5V connector.

4. The control system according to claim 1, wherein the control device is electrically connected to at least a connection port; and one of the at least a connection port is electrically connected to the computer assembly.

5. The control system according to claim 4, where one of the at least a connection port is electrically connected to an extension port on the casing.

6. The control system according to claim 1, wherein the display device comprises at least a seven-segment display and at least a lighting element adjacent to the seven-segment display.

7. The control system according to claim 1, wherein the operation device further comprises at least an adjustment element adjacent to the display switch element.

8. The control system according to claim 1, wherein the fan device comprises at least an inflow element and at least an outflow element configured oppositely to the inflow element.

9. The control system according to claim 1, wherein the computer assembly comprises at least a driving device data-linked with the control device, and at least a processing device data-linked with the driving device.

10. The control system according to claim 9, wherein the processing device is one of a main board, a Central Processing Unit (CPU), a display card, and a power supply.

\* \* \* \* \*